United States Patent
Dhaens et al.

(10) Patent No.: US 10,661,785 B2
(45) Date of Patent: May 26, 2020

(54) SYSTEMS AND METHODS FOR INTEGRATED CHASSIS CONTROL IN GROUND VEHICLES

(71) Applicants: Tenneco Automotive Operating Company Inc., Lake Forest, IL (US); Technische Universitaet Ilmenau, Ilmenau (DE)

(72) Inventors: Miguel Dhaens, Lommel (BE); Dzmitry Savitski, Ilmenau (DE); Valentin Ivanov, Ilmenau (DE); Klaus Augsburg, Arnstadt (DE)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 208 days.

(21) Appl. No.: 15/843,369

(22) Filed: Dec. 15, 2017

(65) Prior Publication Data
US 2019/0184977 A1    Jun. 20, 2019

(51) Int. Cl.
  *B60W 30/02*    (2012.01)
  *B60W 10/184*   (2012.01)
  *B60W 10/22*    (2006.01)

(52) U.S. Cl.
  CPC .......... *B60W 30/02* (2013.01); *B60W 10/184* (2013.01); *B60W 10/22* (2013.01); *B60W 2520/105* (2013.01); *B60W 2520/125* (2013.01); *B60W 2520/14* (2013.01); *B60W 2520/16* (2013.01); *B60W 2520/18* (2013.01); *B60W 2520/26* (2013.01); *B60W 2530/20* (2013.01); *B60W 2540/10* (2013.01); *B60W 2540/12* (2013.01); *B60W 2540/18* (2013.01)

(58) Field of Classification Search
  CPC .... B60W 30/02; B60W 10/184; B60W 10/22; B60W 2520/105; B60W 2520/125; B60W 2520/14; B60W 2520/16; B60W 2520/18; B60W 2520/26; B60W 2530/20; B60W 2540/10; B60W 2540/12; B60W 2540/18
  See application file for complete search history.

(56) References Cited

U.S. PATENT DOCUMENTS

| | | |
|---|---|---|
| 6,226,587 B1 | 5/2001 | Tachihata et al. |
| 6,456,920 B1 | 9/2002 | Nishio et al. |
| (Continued) | | |

OTHER PUBLICATIONS

Alleyne; Improved Vehicle Performance Using Combined Suspension and Braking Forces; Proceedings of the American Control Conference, Jun. 1995.

(Continued)

*Primary Examiner* — Calvin Cheung
(74) *Attorney, Agent, or Firm* — Harness Dickey & Pierce

(57) ABSTRACT

A vehicle chassis control system may include a target calculation module, brake control module, suspension control module, and tire pressure control module. The target calculation module calculates a target brake torque, a target vertical force, and a target tire pressure associated with the wheel of a vehicle. The brake control module adjusts brake torque applied to the wheel based on a comparison of the target brake torque and an estimated current brake torque. The suspension control module adjusts vertical force applied to the wheel based on a comparison of the target vertical force and an estimated current vertical force. The tire pressure control module adjusts tire pressure in the wheel based on a comparison of the target tire pressure and a measured tire pressure.

18 Claims, 4 Drawing Sheets

(56) References Cited

U.S. PATENT DOCUMENTS

| | | | |
|---|---|---|---|
| 6,567,731 B2 | 5/2003 | Chandy | |
| 6,879,898 B2 | 4/2005 | Ghoneim et al. | |
| 6,892,123 B2 | 5/2005 | Hac | |
| 7,164,980 B1 | 1/2007 | Doll et al. | |
| 2003/0192372 A1 | 10/2003 | Claussen et al. | |
| 2005/0027402 A1 | 2/2005 | Koibuchi et al. | |
| 2013/0079988 A1 | 3/2013 | Hirao et al. | |

OTHER PUBLICATIONS

Ting et al.; Nonlinear Control Design of Anti-lock Braking Systems Combined with Active Suspensions; 2004 5th Asian Control Conference.

Shyrokau et al.; Vehicle motion control with subsystem prioritization; Mechatronics 2014.

International Search Report and Written Opinion regarding PCT/US2018/065774, dated Apr. 19, 2019.

SYSTEMS AND METHODS FOR INTEGRATED CHASSIS CONTROL IN GROUND VEHICLES

FIELD

The present disclosure relates generally to vehicle control systems and more particularly to systems and methods for integrated chassis control in ground vehicles.

BACKGROUND

This section provides background information related to the present disclosure which is not necessarily prior art.

Ground vehicles may be equipped with several controllable chassis systems responsible for braking, steering, ride quality, etc. Conventional controllable chassis systems may operate independently of one another. For example, a braking system may operate independently of a suspension system and/or a tire pressure control system.

While some conventional systems have explored integrated chassis control strategies and architectures, these systems are typically described only at a perfunctory level. That is, known systems may contemplate integrated chassis control, but fail to provide requisite specificity in the way of hardware and/or logic design.

Accordingly, a need exists for a detailed integrated chassis control system configured to provide efficient vehicle dynamics control while taking into account simultaneous consideration of several factors such as, but not limited to, stability, handling, driving safety and comfort.

SUMMARY

This section provides a general summary of the disclosure, and is not a comprehensive disclosure of its full scope or all of its features.

According to a feature, a system for providing integrated chassis control within a vehicle is provided. The system may include a target calculation module, a brake control module, a suspension control module, and a tire pressure control module. The target calculation module may calculate a target brake torque, a target vertical force, and a target tire pressure. The target brake torque, target vertical force, and target tire pressure may be associated with the wheel of a vehicle. The calculation of the target brake torque, target vertical force, and target tire pressure may be based on longitudinal, lateral, yaw, roll, pitch, and heave dynamic components of the vehicle. The brake control module may adjust brake torque applied by a friction brake to the wheel based on a comparison of the target brake torque and an estimated current brake torque associated with the wheel. The suspension control module may adjust vertical force applied by a suspension element to the wheel based on a comparison of the target vertical force and an estimated current vertical force associated with the wheel. The tire pressure control module may adjust tire pressure in the wheel via one or more valves connected to the wheel based on a comparison of the target tire pressure and a measured tire pressure associated with the wheel. In one example of the foregoing feature, the brake torque, vertical force, and tire pressure may be adjusted simultaneously. In another example of the foregoing feature, the brake torque, vertical force, and tire pressure may be adjusted at one or more different times.

According to another feature, a method for providing integrated chassis control within a vehicle is provided. The method may include calculating a target brake torque, a target vertical force, and a target tire pressure. The target brake torque, target vertical force, and target tire pressure may be associated with the wheel of a vehicle. The calculation of the target brake torque, target vertical force, and target tire pressure may be based on longitudinal, lateral, yaw, roll, pitch, and heave dynamic components of the vehicle. The method may also include adjusting brake torque applied by a friction brake to the wheel based on a comparison of the target brake torque and an estimated current brake torque associated with the wheel. Further, vertical force applied by a suspension element to the wheel may be adjusted based on a comparison of the target vertical force and an estimated current vertical force associated with the wheel. Finally, according to this feature, the tire pressure in the wheel may be adjusted via one or more valves connected to the wheel based on a comparison of the target tire pressure and a measured tire pressure associated with the wheel. In one example of the foregoing feature, the brake torque, vertical force, and tire pressure may be adjusted simultaneously. In another example of the foregoing feature, the brake torque, vertical force, and tire pressure may be adjusted at one or more different times.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 3:
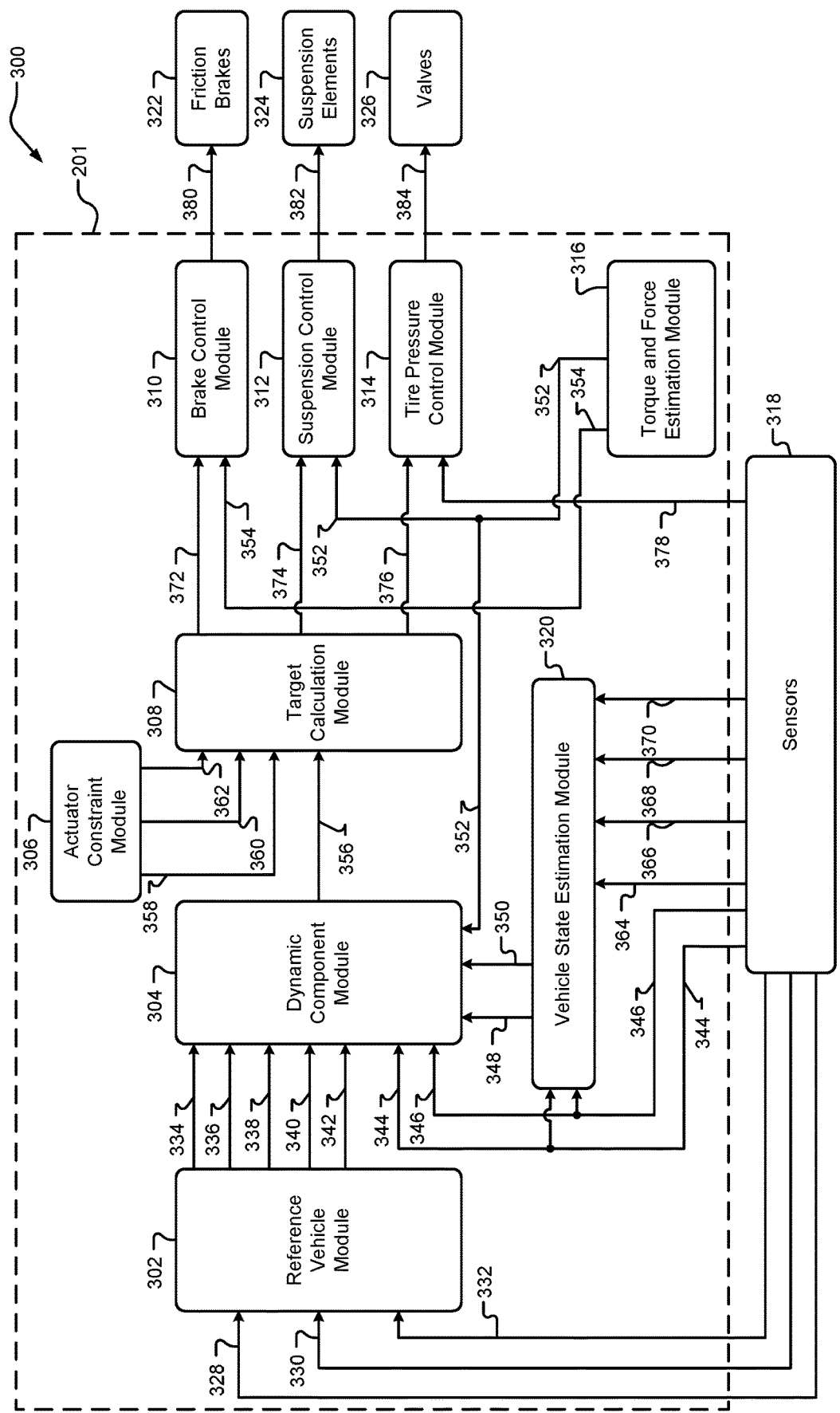
Figure 4:
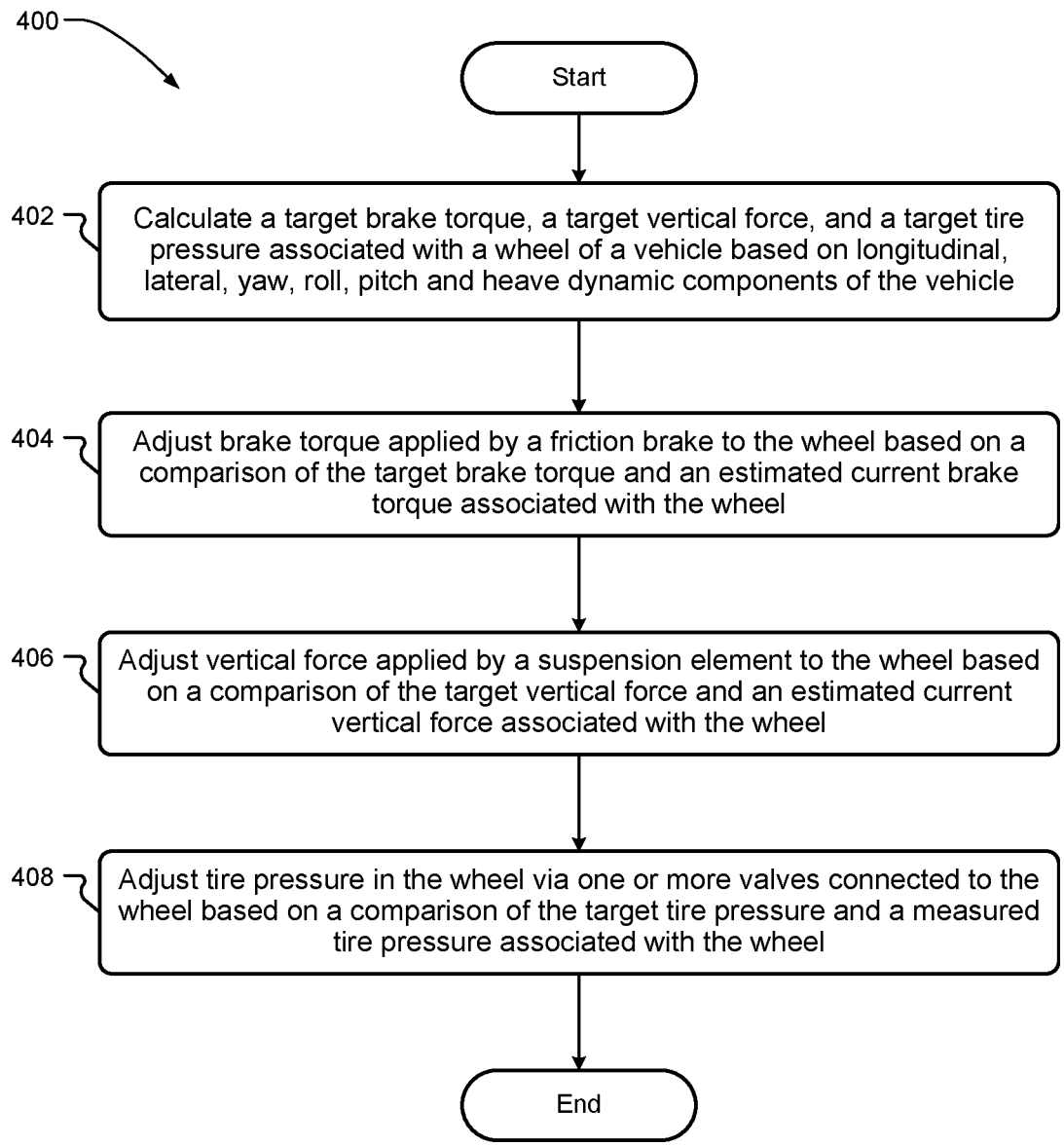

FIG. 3 is a functional block diagram illustrating a detailed view of a chassis control module included as part of an integrated chassis control system in accordance with one example of the teachings of the present disclosure; and FIG. 4 is a flow chart illustrating a method for providing integrated chassis control within a vehicle in accordance with one example of the teachings of the present disclosure.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
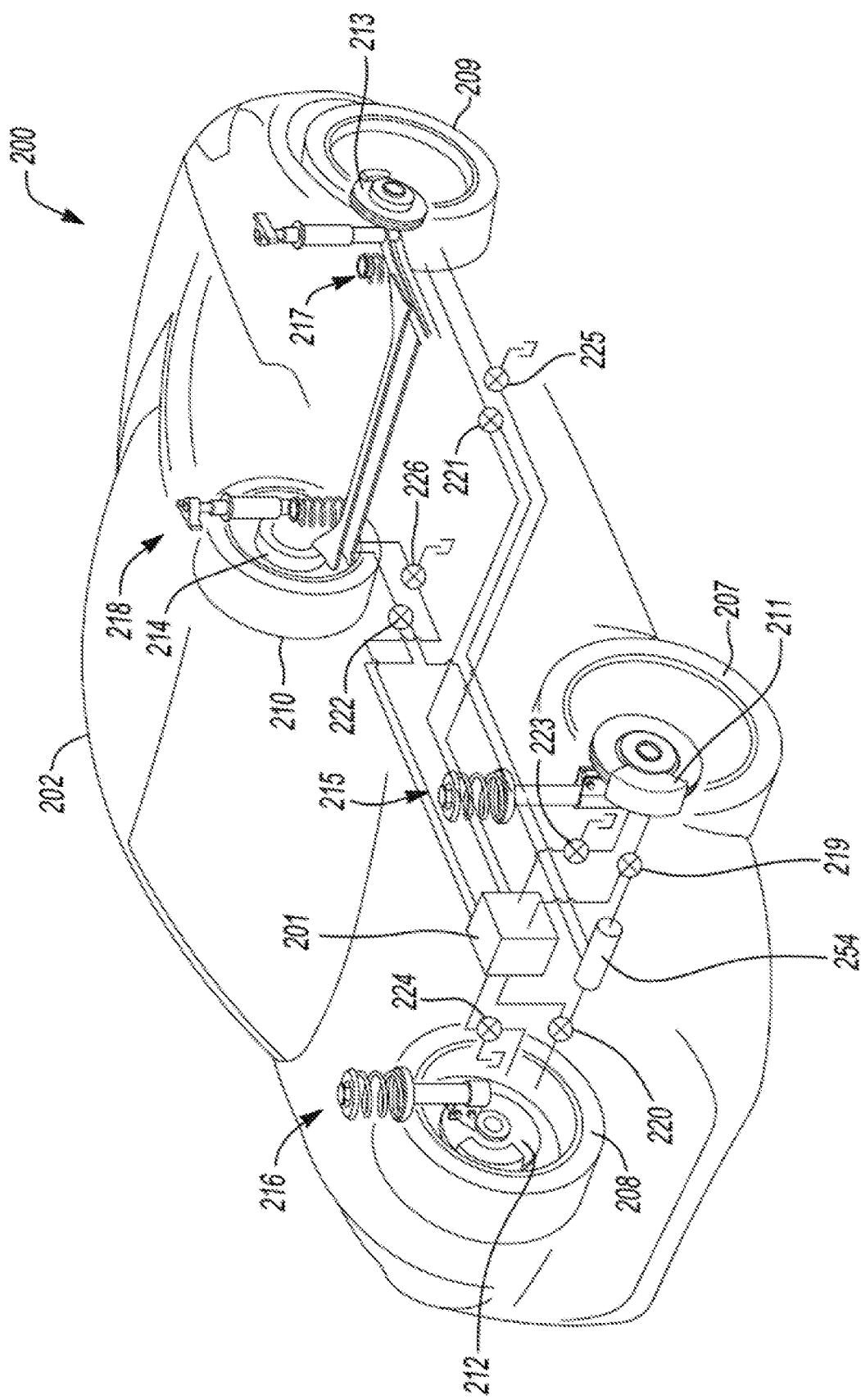
FIG. 1 is a diagrammatic illustration of a vehicle incorporating an integrated chassis control system in accordance with one example of the teachings of the present disclosure.

The following description is merely exemplary in nature and is not intended to limit the present disclosure, application or uses. FIG. 1 shows a vehicle 200 incorporating an integrated chassis control system. The vehicle 200 includes a body 202, an integrated chassis control module 201 configured to set and/or adjust vertical force, brake torque, and/or tire pressure associated with each wheel of the vehicle 200, and a compressor 254 configured to generate gas for use in adjusting tire pressure in one or more the wheels. While the vehicle 200 has been depicted as a passenger car, the integrated chassis control system described herein may be suitably incorporated as part of other types of vehicles and/or in other types of applications, such as vehicles incorporating independent front and/or independent rear suspension systems.

In addition, the vehicle 200 includes a first front wheel 207. The first front wheel 207 includes a first front brake 211 and a first front suspension element 215. A first front inlet valve 219 is connected to the wheel 207, the integrated chassis control module 201, and the compressor 254. The first front inlet valve 219 is configured to supply gas generated by the compressor 254 to the tire of the wheel 207 based on control signals from the integrated chassis control module 201. Similarly, a first front outlet valve 223 is connected to the wheel 207 and the integrated chassis control module 201. The first front outlet valve 223 is configured to expel gas from the tire of the wheel 207 based on control signals from the integrated chassis control module 201. Additionally, the integrated chassis control module 201 may control an amount of brake torque applied by the first front brake 211 on the wheel 207, and an amount of vertical force applied by the first front suspension element 215 on the wheel 207.

Further, the vehicle 200 includes a second front wheel 208. The second front wheel 208 includes a second front brake 212 and a second front suspension element 216. A second front inlet valve 220 is connected to the wheel 208, the integrated chassis control module 201, and the compressor 254. The second front inlet valve 220 is configured to supply gas generated by the compressor 254 to the tire of the wheel 208 based on control signals from the integrated chassis control module 201. Similarly, a second front outlet valve 224 is connected to the wheel 208 and the integrated chassis control module 201. The second front outlet valve 224 is configured to expel gas from the tire of the wheel 208 based on control signals from the integrated chassis control module 201. In addition, the integrated chassis control module 201 may control an amount of brake torque applied by the second front brake 212 on the wheel 208, and an amount of vertical force applied by the second front suspension element 216 on the wheel 208.

The vehicle also 200 includes a first rear wheel 209. The first rear wheel 209 includes a first rear brake 213 and a first rear suspension element 217. A first rear inlet valve 221 is connected to the wheel 209, the integrated chassis control module 201, and the compressor 254. The first rear inlet valve 221 is configured to supply gas generated by the compressor 254 to the tire of the wheel 209 based on control signals from the integrated chassis control module 201. Similarly, a first rear outlet valve 225 is connected to the wheel 209 and the integrated chassis control module 201. The first rear outlet valve 225 is configured to expel gas from the tire of the wheel 209 based on control signals from the integrated chassis control module 201. In addition, the integrated chassis control module 201 may control an amount of brake torque applied by the first rear brake 213 on the wheel 209, and an amount of vertical force applied by the first rear suspension element 217 on the wheel 209.

Further still, the vehicle 200 includes a second rear wheel 210. The second rear wheel 210 includes a second rear brake 214 and a second rear suspension element 218. A second rear inlet valve 222 is connected to the wheel 210, the integrated chassis control module 201, and the compressor 254. The second rear inlet valve 222 is configured to supply gas generated by the compressor 254 to the tire of the wheel 210 based on control signals from the integrated chassis control module 201. Similarly, a second rear outlet valve 226 is connected to the wheel 210 and the integrated chassis control module 201. The second rear outlet valve 226 is configured to expel gas from the tire of the wheel 210 based on control signals from the integrated chassis control module 201. In addition, the integrated chassis control module 201 may control an amount of brake torque applied by the second rear brake 214 on the wheel 210, and an amount of vertical force applied by the second rear suspension element 218 on the wheel 210.

According to some examples, control of the brake torque, vertical force, and tire pressure may occur dynamically (e.g., substantially in real-time) during operation of the vehicle 200. Moreover, vertical force, brake torque, and tire pressure may be customized on a per-wheel basis, or applied equally across all wheels of the vehicle 200. Furthermore, the suspension elements 215-218 may include any suspension elements known in the art including, but not limited to, shock absorbers, struts, or any combination thereof. Similarly, the brakes 211-214 may include any suitable types of brakes known in the art including, but not limited to, friction brakes.

Figure 2:
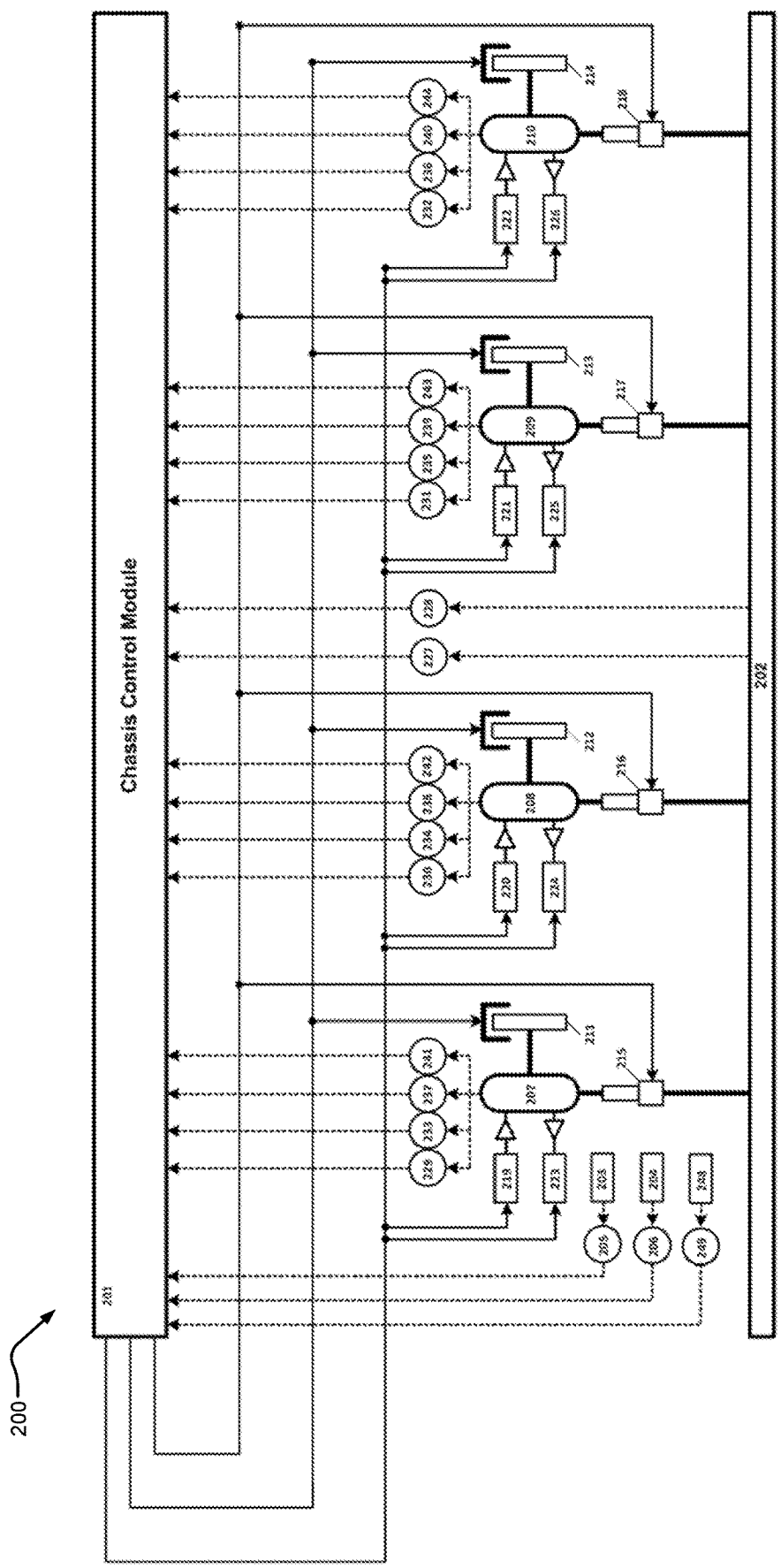
FIG. 2 is a functional block diagram illustrating the vehicle including an integrated chassis control system in accordance with one example of the teachings of the present disclosure.

Referring now to FIG. 2, a schematic of the vehicle 200 including an integrated chassis control system is shown. The vehicle 200 includes an integrated chassis control module 201 configured to set and/or adjust, for example, the vertical force, brake torque, and/or tire pressure associated with each wheel of the vehicle. Although the vehicle 200 is shown including four wheels 207, 208, 209, and 210, according to some implementations, the vehicle 200 may include less or more wheels without deviating from the teachings of the present disclosure.

The vehicle 200 also includes a body 202, which is coupled to the wheels 207-210 via respective suspension elements 215, 216, 217, and 218. The suspension elements 215-218 may include, for example, the types of suspension elements discussed above in the context of FIG. 1, or any other suitable suspension elements known in the art. The suspension elements 215-218 may be configured to adjust the vertical forces applied on the wheels 207-210. The magnitudes of the vertical forces applied by the suspension elements 215-218 on the wheels 207-210 may be defined by the integrated chassis control module 201 and transferred to the suspension elements 215-218 via suitable, respective control signals. According to some examples, the integrated chassis control module 201 may constitute part of a semi-active, or active, suspension implemented within the vehicle 200.

The vehicle 200 may also include brakes 211, 212, 213, and 214 connected to respective wheels 207-210. The brakes 211-214 may include friction brakes or any other suitable brakes known in the art. The brakes 211-214 may be configured to adjustably apply brake torque to the wheels 207-210. The magnitudes of the brake torques applied by the brakes 211-214 on the wheels 207210 may be defined by the integrated chassis control module 201 and transferred to the brakes 211-214 via suitable, respective control signals.

In addition, the vehicle 200 may include inlet valves 219, 220, 221, and 222 and outlet valves 223, 224, 225, and 226 for the wheels 207-210. The inlet valves 219-222 may be attached to the integrated chassis control module 201, one or more compressors (e.g., the compressor 34 shown in FIG. 1), and the tires of the wheels 207-210, and may be configured to allow gas to pass from the compressor(s) to the tires, so as to increase the tire pressure in tires. The integrated chassis control module 210 may define the magnitudes of any tire pressure increases and may also control the opening and closing of the inlet valves 219-222 via suitable, respective control signals. Similarly, the outlet valves 223-226 may be attached to the integrated chassis control module 201 and the tires of the wheels 207-210, and may be configured to allow gas to pass from tires out to an exhaust, so as to decrease the tire pressure in tires. The integrated chassis control module 210 may define the magnitudes of any tire pressure decreases and may also control the opening and closing of the outlet valves 223-262 via suitable, respective control signals.

Further, the vehicle 200 may include a plurality of sensors 205-206, 227-244, and 249 configured to measure various parameters representative of operating conditions of the vehicle 200.

For example, sensor 205 may be configured to measure the position of an acceleration pedal 203, i.e., an accelerator pedal displacement from a baseline acceleration pedal position. In addition, sensor 205 may be configured to generate a signal indicative of the acceleration pedal displacement and transmit such signal to the integrated chassis control module 201 for further processing. Similarly, sensor 206 may be configured to measure the position of a brake pedal, i.e., a brake pedal displacement from a baseline brake pedal position. In addition, sensor 206 may be configured to generate a signal indicative of the brake pedal displacement and transmit such signal to the integrated chassis control module 201 for further processing.

Sensor 249 may be configured to measure the position of the steering wheel, i.e., a steering wheel angle. In addition, sensor 249 may be configured to generate a signal indicative of the steering wheel angle and transmit such signal to the integrated chassis control module 201 for further processing.

Sensors 229, 230, 231, and 232 are mounted to the wheels 207-210. Each sensor of the plurality of sensors 229-232 may be configured to measure the rotational speed of the wheel to which it is mounted (e.g., sensor 229 may measure the speed of wheel 207). In addition, the sensors 229-232 may be configured to generate respective signals indicative of the wheels' rotational speeds and transmit such signals to the integrated chassis control module 201 for further processing.

Sensors 233, 234, 235, and 236 are mounted to the wheels 207-210. Each sensor of the plurality of sensors 233-236 may be configured to measure the tire pressure associated with the wheel to which it is mounted (e.g., sensor 233 may measure the tire pressure associated with the wheel 207). In addition, the sensors 233-236 may be configured to generate respective signals indicative of the tire pressures associated with the wheels 207-210 and transmit such signals to the integrated chassis control module 201 for further processing.

Sensors 237, 238, 239, and 240 are mounted to the wheels 207-210. Each sensor of the plurality of sensors 237-240 may be configured to measure the tire temperature associated with the wheel to which it is mounted (e.g., sensor 237 may measure the tire temperature associated with the wheel 207). In addition, the sensors 237-240 may be configured to generate respective signals indicative of the tire temperatures associated with the wheels 207-210 and transmit such signals to the integrated chassis control module 201 for further processing.

Sensors 241, 242, 243, and 244 are mounted to the suspension elements 215-218. Each sensor of the plurality of sensors 241-244 may be configured to measure the vertical wheel position of the wheel mounted to the suspension element to which the sensor is mounted (e.g., via the displacement of the suspension element itself), i.e., a vertical wheel displacement from a baseline wheel displacement. In addition, the sensors 241-244 may be configured to generate respective signals indicative of the vertical wheel displacements of the wheels 207-210 and transmit such signals to the integrated chassis control module 201 for further processing.

Sensor 227 may be mounted to the vehicle body 202. Sensor 227 may be configured to measure the longitudinal acceleration, lateral acceleration, and yaw rate of the vehicle body 202. In addition, sensor 227 may be configured to generate signals indicative of the longitudinal acceleration, lateral acceleration, and yaw rate of the vehicle body 202 and transmit such signals to the integrated chassis control module 201 for further processing.

Sensor 228 may also be mounted to the vehicle body 202. Sensor 228 may be configured to measure the vertical acceleration of the vehicle body 202. In addition, sensor 228 may be configured to generate a signal indicative of the vertical acceleration of the vehicle body 202 and transmit such signal to the integrated chassis control module 201 for further processing.

Turning now to FIG. 3, a vehicle 300 including an integrated chassis control module 201 is shown. More specifically, FIG. 3 illustrates a detailed view of the integrated chassis control module 201 shown in FIG. 2. The vehicle 300 may be identical, or substantially similar, in structure to the vehicle 200 discussed above with regard to FIGS. 1-2. The integrated chassis control module 201 may be connected to various sensors 318 (such as, for example, the sensors discussed above with regard to FIG. 1), as well as chassis components such as one or more friction brakes 322, one or more suspension elements 324, and one or more valves 326 for controlling brake torque, vertical force, and/or tire pressure on/in the one or more wheels of the vehicle 300.

In the example shown in FIG. 3, the integrated chassis control module 201 includes a reference vehicle module 302, a dynamic component module 304, a vehicle state estimation module 320, an actuator constraint module 306, a target calculation module 308, a brake control module 310, a suspension control module 312, and a torque and force estimation module 316. In operation, the integrated chassis control module 201 may function as follows.

The reference vehicle module 302 obtains (i.e., fetches or receives) various sensor readings 328, 330, and 332 from the sensors 318 of the vehicle 300. More specifically, the reference vehicle module 302 obtains: (i) a sensor reading 328 indicating a steering wheel angle ($\delta$); (ii) a sensor reading 330 indicating a brake pedal displacement ($s_b$) from a baseline brake pedal position; and (iii) a sensor reading 332 indicating an acceleration pedal displacement ($s_a$) from a baseline acceleration pedal position. Based on the sensor readings 328, 330, and 332, the reference vehicle module 302 is configured to calculate a reference wheel slip ($\lambda_i^{ref}$) 334, a reference yaw rate ($d\psi^{ref}/dt$) 336, a reference side slip angle ($\beta^{ref}$) 338, a reference vertical force ($F_{z,i}^{ref}$) 340, and a reference vertical acceleration ($a_z^{ref}$) 342. More specifically, the reference vehicle module 302 is configured to calculate the reference wheel slip ($\lambda_i^{ref}$) 334 and the reference vertical force ($F_{z,i}^{ref}$) 340 for one or more of the wheels of the vehicle 300. Similarly, the reference vehicle module 302 is configured to calculate the reference yaw rate ($d\psi^{ref}/dt$) 336, a reference side slip angle ($\beta^{ref}$) 338, and reference vertical acceleration ($a_z^{ref}$) 342 for the vehicle's body under known road and maneuver conditions.

The vehicle state estimation module 320 obtains various sensor readings 344, 346, 364, 366, 368, and 370 from the sensors 318 of the vehicle 300. More specifically, the vehicle state estimation module 320 obtains: (i) a sensor reading 344 indicating a measured yaw rate ($d\psi^{mes}/dt$) associated with the vehicle's body; (ii) a sensor reading 346 indicating a measured vertical acceleration ($a_z^{mes}$) associated with the vehicle's body; (iii) a sensor reading 364 indicating a measured longitudinal acceleration ($a_x^{mes}$) associated with the vehicle's body; (iv) a sensor reading 366 indicating a measured lateral acceleration ($a_y^{mes}$) associated with the vehicle's body; (v) a sensor reading 368 indicating a measured wheel speed ($\omega_i^{mes}$) associated with one or more of the wheels of the vehicle 300; and (vi) a sensor reading 370 indicating a measured vertical wheel displacement ($z_i^{mes}$) from a baseline wheel displacement associated with one or more of the wheels of the vehicle 300. Based on sensor readings 344, 346, 364, 366, 368, and 370, the vehicle state estimation module 320 is configured to calculate an estimated current wheel slip ($\lambda_i^{est}$) 348 associated with one or more of the wheels of the vehicle 300 and an estimated current side slip angle ($\beta^{est}$) 350 associated with the vehicle's body. As used herein, "estimated current" refers the value or magnitude of a particular parameter at a present, or substantially present, point in time (e.g., a "real-time," or substantially real-time, estimate of a particular parameter).

The dynamic component module 304 obtains outputs 334, 336, 338, 340, and 342 from the reference vehicle module 302, outputs 348 and 350 from the vehicle state estimation module 320, and sensor readings 344 and 346 from the sensors 318 of the vehicle. In addition, the dynamic component module 304 obtains an estimated current vertical force ($F_{z,i}^{est}$) 352 from the torque and force estimation module 316 (which is configured to calculate, among other things, the estimated current vertical force ($F_{z,i}^{est}$) 352 according to techniques known in the art). The dynamic component module 304 is configured to calculate the longitudinal, lateral, yaw, roll, pitch, and heave dynamic components of the vehicle 356 based on outputs 334, 336, 338, 340, 342, 348, 350, and 352 and sensor readings 344 and 346. More specifically, the dynamic component module 304 is configured to calculate a virtual control input v* 356 representing the longitudinal, lateral, yaw, roll, pitch, and heave dynamic components of the vehicle according to the following equation:

$$v^* = [v^{long}\ v^{lat}\ v^{yaw}\ v^{roll}\ v^{pitch}\ v^{heave}] \quad\quad \text{(Equation 1)}$$

where $v^{long}\ v^{lat}\ v^{yaw}\ v^{roll}\ v^{pitch}$ and $v^{heave}$ are the components related to the parameters of longitudinal, lateral, yaw, roll, pitch and heave dynamics of the vehicle. These components 356 may be calculated by the dynamic component module 304 based on the following: (i) a difference between an estimated current wheel slip ($\lambda_i^{est}$) 348 associated with one or more of the wheels and a reference wheel slip ($\lambda_i^{ref}$) 334 associated with the one or more wheels; (ii) a difference between an estimated current vertical force ($F_{z,i}^{est}$) 352 associated with the one or more wheels and a reference vertical force ($F_{z,i}^{ref}$) 340 associated with the one or more wheels; (iii) a difference between an estimated current side slip angle ($\beta^{est}$) 350 associated with the vehicle's body and a reference side slip angle ($\beta^{ref}$) 338 associated with the vehicle's body; (iv) a difference between a measured yaw rate ($d\psi^{mes}/dt$) 344 associated with the vehicle's body and a reference yaw rate ($d\psi^{ref}/dt$) 336 associated with the vehicle's body; and (v) a difference between a measured vertical acceleration ($a_z^{mes}$) 346 associated with the vehicle's body and a reference vertical acceleration ($a_z^{ref}$) 342 associated with the vehicle's body.

The target calculation module 308 obtains the virtual control input v* 356 from the dynamic component module 304. In addition, according to one example implementation, the target calculation module 308 also obtains one or more actuator constraints 358, 360, and/or 362 from the actuator constraint module 306. The actuator constraints 358, 360, and 362 may define lower $u_{lim,j}^{low}$ and upper $u_{lim,j}^{up}$ actuator constraints associated with the one or more friction brakes 322, one or more suspension elements 324, and/or one or more valves 326. More specifically, constraint set 358 may indicate upper and lower actuator constraints associated with the one or more friction brakes, constraint set 360 may indicate upper and lower actuator constraints associated with the one or more suspension elements, and constraint set 362 may indicate upper and lower actuator constraints associated with the one or more valves. The target calculation module 308 is configured to calculate a target brake torque ($T_{br,i}^{CA}$) 372 for each of the one or more friction brakes 322, a target vertical force ($F_{z,i}^{CA}$) 374 for each of the one or more suspension elements 324, and a target tire pressure ($p_i^{CA}$) 376 for each wheel to be set or maintained through the one or more valves 326 based on the control input v* 356 and/or one or more of the actuator constraint sets 358, 360, and/or 362.

The brake control module 310 obtains the target brake torque ($T_{br,i}^{CA}$) 372 from the target calculation module 308 and an estimated current brake toque ($T_{br,i}^{est}$) 354 associated with the one or more friction brakes 322 from the torque and force estimation module 316 (which is configured to calculate the estimated current brake toque ($T_{br,i}^{est}$) 354, in addition to the estimated current vertical force ($F_{z,i}^{est}$) 352, according to techniques known in the art). Based on a comparison of the target brake torque ($T_{br,i}^{CA}$) 372 and the estimated current brake toque ($T_{br,i}^{est}$) 354, the brake control module 310 is configured to generate a brake torque adjustment signal 380 configured to adjust the brake torque applied by the one or more friction brakes 322 to each of the one or more wheels of the vehicle 300.

The suspension control module 312 obtains the target vertical force ($F_{z,i}^{CA}$) 374 from the target calculation module 308 and the estimated current vertical force ($F_{z,i}^{est}$) 354 associated with the one or more wheels from the torque and force estimation module 316. Based on a comparison of the target vertical force ($F_{z,i}^{CA}$) 374 and the estimated current vertical force ($F_{z,i}^{est}$) 354, the suspension control module 312 is configured to generate a vertical force adjustment signal 382 configured to adjust the vertical force applied by the one or more suspension elements 324 to each of the one or more wheels of the vehicle 300.

The tire pressure control module 314 obtains the target tire pressure ($p_i^{CA}$) 376 from the target calculation module 308 and measured tire pressure ($p_i^{mes}$) 378 associated with the one or more wheels from the sensors 318. Based on a comparison of the target tire pressure ($p_i^{CA}$) 376 and the measured tire pressure ($p_i^{mes}$) 378, the tire pressure control module 314 is configured to generate a tire pressure adjustment signal 384 configured to adjust the tire pressure in each of the one or more wheels of the vehicle 300 via the one or more valves 326 connected to the one or more wheels.

In some examples, the brake torque, vertical force, and tire pressure may be adjusted simultaneously. In other examples, the brake torque, vertical force, and tire pressure may be adjusted at one or more different times.

Referring now to FIG. 4, a method 400 for providing integrated chassis control within a vehicle is provided. The method 400 begins at 402 where a target brake torque, a target vertical force, and a target tire pressure associated with a wheel of the vehicle are calculated. The target brake torque, target vertical force, and target tire pressure may be calculated based on longitudinal, lateral, yaw, roll, pitch, and heave dynamic components of the vehicle. At 404, brake torque applied by a friction brake to the wheel may be adjusted based on a comparison of the target brake torque and an estimated current brake torque associated with the wheel. At 406, vertical force applied by a suspension element to the wheel may be adjusted based on a comparison of the target vertical force and an estimated current vertical force associated with the wheel. Finally, at 408, tire pressure in the wheel may be adjusted via one or more valves (e.g., one or more inlet and/or outlet valves) connected to the wheel based on a comparison of the target tire pressure and a measured tire pressure associated with the wheel. In some examples, the brake torque, vertical force, and tire pressure may be adjusted simultaneously. In other examples, the brake torque, vertical force, and tire pressure may be adjusted at one or more different times.

According to some examples (not shown in FIG. 4), the method may further include calculations of differences between certain estimated current or measured parameter values and certain reference parameter values. According to this example, the method may include (i) calculating a difference between an estimated current wheel slip associated with the wheel and a reference wheel slip associated with the wheel to provide a first calculated difference; (ii) calculating a difference between an estimated current vertical force associated with the wheel and a reference vertical force associated with the wheel to provide a second calculated difference; (iii) calculating a difference between an estimated current side slip angle associated with a body of the vehicle and a reference side slip angle associated with the body of the vehicle to provide a third calculated difference; (iv) calculating a difference between a measured yaw rate associated with the body of the vehicle and a reference yaw rate associated with the body of the vehicle to provide a fourth calculated difference; and (v) calculating a difference between a measured vertical acceleration associated with the body of the vehicle and a reference vertical acceleration associated with the body of the vehicle to provide a fifth calculated difference. According to another example of the foregoing method, longitudinal, lateral, yaw, roll, pitch and heave dynamic components of the vehicle may be calculated based on the first, second, third, fourth, and fifth calculated differences.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle chassis control system comprising:
a target calculation module that calculates a target brake torque, a target vertical force, and a target tire pressure associated with a wheel of a vehicle based on longitudinal, lateral, yaw, roll, pitch and heave dynamic components of the vehicle;
a brake control module that adjusts brake torque applied by a friction brake to the wheel based on a comparison of the target brake torque and an estimated current brake torque associated with the wheel;
a suspension control module that adjusts vertical force applied by a suspension element to the wheel based on a comparison of the target vertical force and an estimated current vertical force associated with the wheel;
a tire pressure control module that adjusts tire pressure in the wheel via one or more valves connected to the wheel based on a comparison of the target tire pressure and a measured tire pressure associated with the wheel; and
a dynamic component module that calculates the longitudinal, lateral, yaw, roll, pitch and heave dynamic components of the vehicle based on:
a difference between an estimated current wheel slip associated with the wheel and a reference wheel slip associated with the wheel;
a difference between an estimated current vertical force associated with the wheel and a reference vertical force associated with the wheel;
a difference between an estimated current side slip angle associated with a body of the vehicle and a reference side slip angle associated with the body of the vehicle;
a difference between a measured yaw rate associated with the body of the vehicle and a reference yaw rate associated with the body of the vehicle; and
a difference between a measured vertical acceleration associated with the body of the vehicle and a reference vertical acceleration associated with the body of the vehicle.

2. The system of claim 1, further comprising:
a reference vehicle module that calculates the reference wheel slip, reference vertical force, reference side slip angle, reference yaw rate, and reference vertical acceleration based on:
an accelerator pedal displacement from a baseline acceleration pedal position;
a brake pedal displacement from a baseline brake pedal position; and
a steering wheel angle.

3. The system of claim 1, further comprising:
a vehicle state estimation module that calculates the estimated current wheel slip and the estimated current side slip angle based on:
the measured yaw rate;
a measured longitudinal acceleration associated with the body of the vehicle;
a measured lateral acceleration associated with the body of the vehicle;
the measured vertical acceleration;
a measured wheel speed associated with the wheel; and
a measured vertical wheel displacement from a baseline wheel displacement.

4. The system of claim 3, further comprising:
a plurality of sensors that determine:
the measured yaw rate;
the measured longitudinal acceleration;
the measured lateral acceleration;
the measured vertical acceleration;
the measured wheel speed; and
the measured vertical wheel displacement.

5. The system of claim 4, wherein the plurality of sensors also determine:
an accelerator pedal displacement from a baseline acceleration pedal position;
a brake pedal displacement from a baseline brake pedal position;
a steering wheel angle;
the measured tire pressure associated with the wheel; and
a tire temperature associated with the wheel.

6. The system of claim 1, further comprising:
the suspension element, wherein the suspension element is connected to the wheel and applies vertical force to the wheel.

7. The system of claim 1, further comprising:
the one or more valves, wherein the one or more valves are connected to the wheel and adjust tire pressure in the wheel.

8. The system of claim 7, wherein the one or more valves comprise an inlet valve and an outlet valve.

9. A vehicle chassis control system comprising:
a target calculation module that calculates a target brake torque, a target vertical force, and a target tire pressure associated with a wheel of a vehicle based on longitudinal, lateral, yaw, roll, pitch and heave dynamic components of the vehicle;
a brake control module that adjusts brake torque applied by a friction brake to the wheel based on a comparison of the target brake torque and an estimated current brake torque associated with the wheel;
a suspension control module that adjusts vertical force applied by a suspension element to the wheel based on a comparison of the target vertical force and an estimated current vertical force associated with the wheel; and
a tire pressure control module that adjusts tire pressure in the wheel via one or more valves connected to the wheel based on a comparison of the target tire pressure and a measured tire pressure associated with the wheel, the vehicle chassis control system further comprising:
the friction brake, wherein the friction brake is connected to the brake control module and applies brake torque to the wheel.

10. A vehicle chassis control system comprising:
a target calculation module that calculates a target brake torque, a target vertical force, and a target tire pressure associated with a wheel of a vehicle based on longitudinal, lateral, yaw, roll, pitch and heave dynamic components of the vehicle;
a brake control module that adjusts brake torque applied by a friction brake to the wheel based on a comparison of the target brake torque and an estimated current brake torque associated with the wheel;
a suspension control module that adjusts vertical force applied by a suspension element to the wheel based on a comparison of the target vertical force and an estimated current vertical force associated with the wheel; and
a tire pressure control module that adjusts tire pressure in the wheel via one or more valves connected to the wheel based on a comparison of the target tire pressure and a measured tire pressure associated with the wheel, wherein the target calculation module calculates the target brake torque based on respective upper and lower actuator constraints associated with the friction brake.

11. A vehicle chassis control system comprising:
a target calculation module that calculates a target brake torque, a target vertical force, and a target tire pressure associated with a wheel of a vehicle based on longitudinal, lateral, yaw, roll, pitch and heave dynamic components of the vehicle;
a brake control module that adjusts brake torque applied by a friction brake to the wheel based on a comparison of the target brake torque and an estimated current brake torque associated with the wheel;
a suspension control module that adjusts vertical force applied by a suspension element to the wheel based on a comparison of the target vertical force and an estimated current vertical force associated with the wheel; and
a tire pressure control module that adjusts tire pressure in the wheel via one or more valves connected to the wheel based on a comparison of the target tire pressure and a measured tire pressure associated with the wheel, wherein the target calculation module calculates the target vertical force based on respective upper and lower actuator constraints associated with the suspension element.

12. A vehicle chassis control system comprising:
a target calculation module that calculates a target brake torque, a target vertical force, and a target tire pressure associated with a wheel of a vehicle based on longitudinal, lateral, yaw, roll, pitch and heave dynamic components of the vehicle;
a brake control module that adjusts brake torque applied by a friction brake to the wheel based on a comparison of the target brake torque and an estimated current brake torque associated with the wheel;
a suspension control module that adjusts vertical force applied by a suspension element to the wheel based on a comparison of the target vertical force and an estimated current vertical force associated with the wheel; and
a tire pressure control module that adjusts tire pressure in the wheel via one or more valves connected to the wheel based on a comparison of the target tire pressure and a measured tire pressure associated with the wheel, wherein the target calculation module calculates the target tire pressure based on respective upper and lower actuator constraints associated with the one or more valves.

13. A method for controlling a vehicle chassis system comprising:
calculating a target brake torque, a target vertical force, and a target tire pressure associated with a wheel of a vehicle based on longitudinal, lateral, yaw, roll, pitch and heave dynamic components of the vehicle;
adjusting brake torque applied by a friction brake to the wheel based on a comparison of the target brake torque and an estimated current brake torque associated with the wheel;
adjusting vertical force applied by a suspension element to the wheel based on a comparison of the target vertical force and an estimated current vertical force associated with the wheel;
adjusting tire pressure in the wheel via one or more valves connected to the wheel based on a comparison of the target tire pressure and a measured tire pressure associated with the wheel;
calculating a difference between an estimated current wheel slip associated with the wheel and a reference wheel slip associated with the wheel to provide a first calculated difference;
calculating a difference between an estimated current vertical force associated with the wheel and a reference vertical force associated with the wheel to provide a second calculated difference;
calculating a difference between an estimated current side slip angle associated with a body of the vehicle and a reference side slip angle associated with the body of the vehicle to provide a third calculated difference;
calculating a difference between a measured yaw rate associated with the body of the vehicle and a reference yaw rate associated with the body of the vehicle to provide a fourth calculated difference; and
calculating a difference between a measured vertical acceleration associated with the body of the vehicle and a reference vertical acceleration associated with the body of the vehicle to provide a fifth calculated difference.

14. The method of claim 13, further comprising:
calculating the longitudinal, lateral, yaw, roll, pitch and heave dynamic components of the vehicle based on the first, second, third, fourth, and fifth calculated differences.

15. The method of claim 13, further comprising:
calculating the estimated current wheel slip and the estimated current side slip angle based on:
the measured yaw rate;
a measured longitudinal acceleration associated with the body of the vehicle;
a measured lateral acceleration associated with the body of the vehicle;
the measured vertical acceleration;
a measured wheel speed associated with the wheel; and
a measured vertical wheel displacement from a baseline wheel displacement.

16. A method for controlling a vehicle chassis system comprising:
calculating a target brake torque, a target vertical force, and a target tire pressure associated with a wheel of a vehicle based on longitudinal, lateral, yaw, roll, pitch and heave dynamic components of the vehicle;

adjusting brake torque applied by a friction brake to the wheel based on a comparison of the target brake torque and an estimated current brake torque associated with the wheel;

adjusting vertical force applied by a suspension element to the wheel based on a comparison of the target vertical force and an estimated current vertical force associated with the wheel;

adjusting tire pressure in the wheel via one or more valves connected to the wheel based on a comparison of the target tire pressure and a measured tire pressure associated with the wheel;

determining an accelerator pedal displacement from a baseline acceleration pedal position;

determining a brake pedal displacement from a baseline brake pedal position; and determining a steering wheel angle.

17. The method of claim 16, further comprising:
calculating the reference wheel slip, reference vertical force, reference side slip angle, reference yaw rate, and reference vertical acceleration based on the accelerator pedal displacement, brake pedal displacement, and steering wheel angle.

18. A method for controlling a vehicle chassis system comprising:
calculating a target brake torque, a target vertical force, and a target tire pressure associated with a wheel of a vehicle based on longitudinal, lateral, yaw, roll, pitch and heave dynamic components of the vehicle;

adjusting brake torque applied by a friction brake to the wheel based on a comparison of the target brake torque and an estimated current brake torque associated with the wheel;

adjusting vertical force applied by a suspension element to the wheel based on a comparison of the target vertical force and an estimated current vertical force associated with the wheel; and adjusting tire pressure in the wheel via one or more valves connected to the wheel based on a comparison of the target tire pressure and a measured tire pressure associated with the wheel, wherein:

calculating the target brake torque comprises calculating the target brake torque based on respective upper and lower actuator constraints associated with the friction brake;

calculating the target vertical force comprises calculating the target vertical force based on respective upper and lower actuator constraints associated with the suspension element; and calculating the target tire pressure comprises calculating the target tire pressure based on respective upper and lower actuator constraints associated with the one or more valves.

* * * * *